(12) United States Patent
Motohashi et al.

(10) Patent No.: US 9,153,815 B2
(45) Date of Patent: Oct. 6, 2015

(54) CATHODE ACTIVE MATERIAL, CATHODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Kazunari Motohashi, Fukushima (JP); Kazuaki Endoh, Fukushima (JP); Hironobu Tsuji, Fukushima (JP); Yosuke Hosoya, Fukushima (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 13/854,500

(22) Filed: Apr. 1, 2013

(65) Prior Publication Data

US 2013/0266831 A1    Oct. 10, 2013

(30) Foreign Application Priority Data

Apr. 9, 2012  (JP) ................. 2012-088450

(51) Int. Cl.

| | |
|---|---|
| *H01M 4/131* | (2010.01) |
| *H01M 4/505* | (2010.01) |
| *H01M 4/525* | (2010.01) |
| *H01M 10/0525* | (2010.01) |
| *H01M 10/42* | (2006.01) |
| *H01M 4/38* | (2006.01) |
| *H01M 4/587* | (2010.01) |

(52) U.S. Cl.
CPC .............. *H01M 4/131* (2013.01); *H01M 4/505* (2013.01); *H01M 4/525* (2013.01); *H01M 10/0525* (2013.01); *H01M 10/425* (2013.01); *H01M 4/386* (2013.01); *H01M 4/587* (2013.01); *H01M 2220/10* (2013.01); *H01M 2220/20* (2013.01); *Y02E 60/122* (2013.01); *Y02T 10/7011* (2013.01)

(58) Field of Classification Search
CPC ... H01M 4/131; Y02E 60/122; Y02E 10/7011
USPC ........ 429/61, 221, 223, 224, 231.95; 320/135
See application file for complete search history.

(56) References Cited

U.S. PATENT DOCUMENTS

| | | | |
|---|---|---|---|
| 2006/0147796 A1* | 7/2006 | Miura et al. .................. | 429/209 |
| 2014/0159920 A1* | 6/2014 | Furui et al. ............... | 340/870.07 |

FOREIGN PATENT DOCUMENTS

| | | |
|---|---|---|
| JP | 08-002921 | 1/1996 |
| JP | 2002-226214 | 8/2002 |
| JP | 2006-202724 | 8/2006 |
| JP | 2010-097947 | 4/2010 |
| JP | 2011-096626 | 5/2011 |
| WO | 2009/054436 | 4/2009 |

OTHER PUBLICATIONS

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid-State Letters, vol. 9, No. 5, pp. A221-A224, 2006. (4 pages).

* cited by examiner

*Primary Examiner* — Cynthia H Kelly
*Assistant Examiner* — Monique Wills
(74) *Attorney, Agent, or Firm* — K&L Gates LLP

(57) ABSTRACT

A cathode active material is a lithium-rich lithium-containing compound having a bedded salt-type crystal structure. A product SD of a specific surface area S in square meters per gram and a crystallite diameter D in micrometer is equal to or more than about $1.4 \times 10^{-6}$ cubic meters per gram.

26 Claims, 6 Drawing Sheets

CATHODE ACTIVE MATERIAL, CATHODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2012-088450 filed in the Japan Patent Office on Apr. 9, 2012, the entire content of which is hereby incorporated by reference.

BACKGROUND

The present application relates to a cathode active material as a lithium-containing compound, to a cathode and a secondary battery that use the cathode active material, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed. In these days, it has been considered to apply such a secondary battery to various other applications in addition to the foregoing electronic apparatuses. Representative examples of such other applications include a battery pack attachably and detachably mounted on the electronic apparatuses or the like, an electric vehicle such as an electric automobile, an electric power storage system such as a home electric power server, and an electric power tool such as an electric drill.

Secondary batteries utilizing various charge and discharge principles to obtain a battery capacity have been proposed. In particular, a secondary battery utilizing insertion and extraction of an electrode reactant or a secondary battery utilizing precipitation and dissolution of an electrode reactant has attracted attention, since such a secondary battery provides higher energy density than lead batteries, nickel-cadmium batteries, and the like.

The secondary battery includes a cathode, an anode, and an electrolytic solution. The cathode contains a cathode active material contributing to a charge and discharge reaction. As the cathode active material, generally, a lithium-containing compound such as $LiCoO_2$, $LiNiO_2$, and $Li(Ni_{0.5}Co_{0.2}Mn_{0.3})O_2$ is widely used.

In the development field of the secondary battery, increasing the charging voltage to a value larger than 4.2 V has been considered to fulfill a need for achieving a high-capacity of the secondary battery. However, in the case where the charging voltage is increased, a lithium-containing compound is easily degraded. Thereby, cycle characteristics as one of the important characteristics of the secondary battery are lowered. Therefore, it is substantially difficult to increase the charging voltage at present. Accordingly, as a cathode active material for a high charging voltage, a lithium-rich lithium-containing compound represented by a general formula $Li_{1+a}[Mn_bMn_{1-b}]_{1-a}O_{2-c}$ has been proposed (for example, see Electrochemical and Solid-State Letters, 9(5), A221-A224 (2006)). In the formula, M represents a transition metal element (excluding Mn), and $0<a<0.25$, $0.3 \leq b<0.7$, and $-0.1 \leq c \leq 0.2$ are satisfied. In the case where the lithium-rich lithium-containing compound is used, a discharge capacity more than about 250 mAh/g is obtained.

In the case where the lithium-rich lithium-containing compound is used, the cycle characteristics and/or the like is improved. On the other hand, lithium ions are less likely to be inserted and extracted mainly due to increased resistance, and therefore, load characteristics are lowered. Since such a disadvantage of the lowered load characteristics may be an obstacle to practical use thereof, various studies have been made to improve the load characteristics.

Specifically, in a high-lithium-containing transition metal composite oxide particle represented by a general formula $Li_{1+x-s}Mn_{1-x-y}M_yO_{2-t}$, the crystal structure of the particle is changed from a layered structure to a spinel structure as the position thereof gets from the center side to the surface side (for example, see Japanese Unexamined Patent Application Publication No. 2011-096626). In the formula, M represents a transition metal element other than Mn, and $0<x<0.33$, $0<y<0.66$, $0<s<0.3$, and $0<t<0.15$ are satisfied.

In a lithium-manganese composite oxide having a spinel-type crystal structure represented by a general formula $Li_{1+X}Mn_{2-Y-Z}M_ZO_{4+\delta}$, the average particle diameter is from 5 μm to 20 μm both inclusive, the BET specific surface area is equal to or less than 1 $m^2/g$, and the average crystallite diameter is equal to or more than 100 nm (for example, see Japanese Unexamined Patent Application Publication No. 2002-226214). In the formula, M represents Ni or the like, and $0 \leq X \leq 1/3$, $0 \leq Y \leq 1/3$, $0 < Z \leq 0.25$, and $-0.14 \leq \delta \leq 0.5$ are satisfied.

In a lithium-manganese composite oxide having a spinel-type structure represented by a general formula $Li_xMn_2O_y$, the BET specific surface area is equal to or more than 2 $m^2/g$, and the crystallite diameter is equal to or more than 30 nm (for example, see Japanese Unexamined Patent Application Publication No. H08-002921). In the formula, $1<x<1.6$, $4<y<4.8$, $(8/3+4/3 \times x)<y<(4+1/2 \times x)$ are satisfied.

In a lithium-transition-metal composite oxide having a spinel-type (Fd3-m) represented by a general formula $Li_{1+x}M_{2-x}O_4$, the specific surface area is from 0.35 $m^2/g$ to 0.8 $m^2/g$ both inclusive, and the crystallite size is from 170 nm to 490 nm both inclusive (for example, see WO2009/054436). In the formula, M represents Mn or the like, and $0.01 \leq X \leq 0.08$ is satisfied.

Regarding a manganese composite oxide, a nickel composite oxide, and a cobalt composite oxide, the specific surface areas are equal to or more than 5 $m^2/g$, and the crystallite diameters are equal to or less than 70 nm (for example, see Japanese Unexamined Patent Application Publication No. 2006-202724).

In a lithium-transition-metal composite oxide having a spinel-type (Fd3-m) represented by a general formula $Li(Li_xMg_yAl_zMn_{2-x-y-z})O_4$, the specific surface area is from 0.35 $m^2/g$ to 0.8 $m^2/g$ both inclusive, and the crystallite size is from 170 nm to 490 nm both inclusive (for example, see Japanese Unexamined Patent Application Publication No. 2010-097947). In the formula, $0.01 \leq x \leq 0.08$, $0.02 \leq y \leq 0.07$, and $0.06 \leq z \leq 0.14$ are satisfied.

SUMMARY

In recent years, high performance and multi-functions of electronic apparatuses and the like to which a secondary battery is applied are increasingly developed, and frequency in use of the electronic apparatuses and the like is also increased. Therefore, further improvement of the load characteristics of the secondary battery has been desired.

It is desirable to provide a cathode active material, a cathode, a secondary battery, a battery pack, an electric vehicle, an electric power storage system, an electric power tool, and an electronic apparatus that are capable of improving load characteristics.

According to an embodiment of the present application, there is provided a secondary battery, including: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided a cathode active material. The cathode active material is a lithium-rich lithium-containing compound having a bedded salt-type crystal structure. A product SD of a specific surface area S in square meters per gram and a crystallite diameter D in micrometer is equal to or more than about $1.4 \times 10^{-6}$ cubic meters per gram.

According to an embodiment of the present application, there is provided a cathode, including a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided a battery pack, including: a secondary battery; a control section controlling a used state of the secondary battery; and a switch section switching the used state of the secondary battery according to an instruction of the control section. The secondary battery includes: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided an electric vehicle, including: a secondary battery; a conversion section converting electric power supplied from the secondary battery into drive power; a drive section operating according to the drive power; and a control section controlling a used state of the secondary battery. The secondary battery includes: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided an electric power storage system, including: a secondary battery; one or more electric devices supplied with electric power from the secondary battery; and a control section controlling the supplying of the electric power from the secondary battery to the one or more electric devices. The secondary battery includes: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided an electric power tool, including: a secondary battery; and a movable section being supplied with electric power from the secondary battery. The secondary battery includes: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

According to an embodiment of the present application, there is provided an electronic apparatus with a secondary battery as an electric power supply source. The secondary battery includes: a cathode; an anode; and an electrolytic solution. The cathode includes a lithium-rich lithium-containing compound having a bedded salt-type crystal structure. A product SD of a specific surface area S in square meters per gram and a crystallite diameter D in micrometer of the lithium-containing compound is equal to or more than about $1.4 \times 10^{-6}$ cubic meters per gram.

As used herein, the term "lithium-rich" refers to a state that Li is excessive in the lithium-containing compound. More specifically, the term "lithium-rich" refers to a state that a mole ratio of Li is larger than 1 in the case where an average composition of the lithium-containing compound is expressed. The "specific surface area S in square meters per gram $(m^2/g)$" is measured by a BET method. Further, the "crystallite diameter D in micrometer $(\mu m)$" is calculated from Scherrer's formula based on an analytical result (half bandwidth of a diffraction line in the vicinity of $2\theta=19\pm2°$) by a powder X-ray diffraction method.

According to the cathode active material, the cathode, and the secondary battery of the above-described embodiments of the present application, since the product SD of the specific surface area S and the crystallite diameter D of the lithium-rich lithium-containing compound having the bedded salt-type crystal structure is equal to or more than about $1.4 \times 10^{-6}$ $m^3/g$, load characteristics are allowed to be improved. Further, according to the battery pack, the electric vehicle, the electric power storage system, the electric power tool, and the electronic apparatus of the above-described embodiments of the present application, similar effects are obtainable.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

Figure 1:
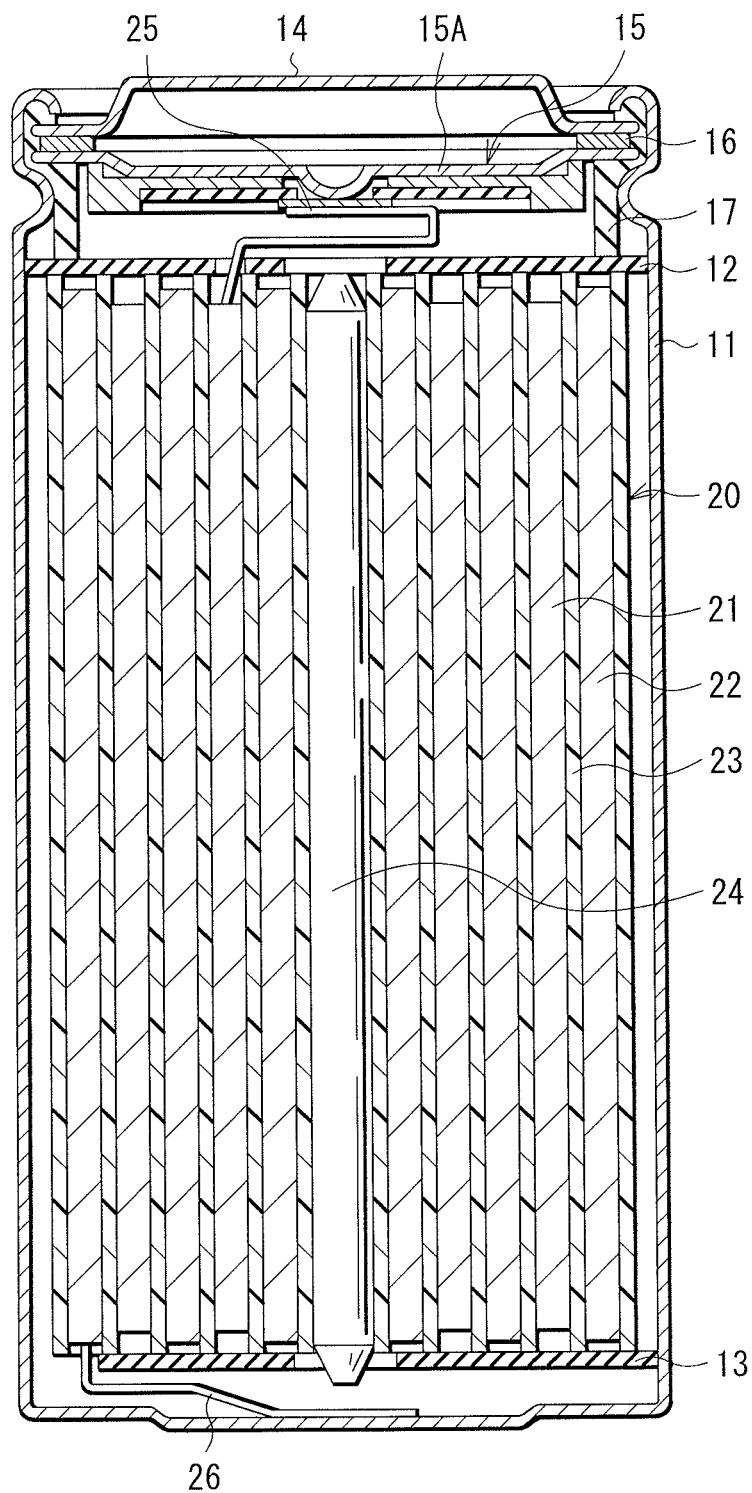
FIG. 1 is a cross-sectional view illustrating a configuration of a secondary battery (cylindrical type) according to an embodiment of the present application.

An embodiment of the present application will be hereinafter described in detail with reference to the drawings. The description will be given in the following order.
1. Cathode Active Material
2. Application Examples of Cathode Active Material (Lithium Secondary Batteries)
2-1. Cathode and Lithium Ion Secondary Battery (Cylindrical Type)
2-2. Cathode and Lithium Ion Secondary Battery (Laminated Film Type)
2-3. Cathode and Lithium Metal Secondary Battery
3. Applications of Secondary Battery
3-1. Battery Pack
3-2. Electric Vehicle
3-3. Electric Power Storage System
3-4. Electric Power Tool
  [1. Cathode Active Material]
  [Configuration of Cathode Active Material]

A cathode active material according to an embodiment of the present application is a compound (lithium-containing compound) containing Li as a constituent element, and for example, is used for a cathode of a lithium secondary battery (hereinafter simply referred to as "secondary battery") or the like.

The lithium-containing compound has a bedded salt-type crystal structure, and is a so-called lithium-rich (Li excess) compound. One reason why the lithium-containing compound is a lithium-rich compound is that, since in this case, the lithium-containing compound contains a great amount of Li as a constituent element, a generation reaction of an irreversible capacity is allowed to be substantially completed in an anode at the time of initial charge.

More specifically, it is known that, since a coat (such as an SEI film) is formed on the surface of an anode at the time of initial charge and discharge of a secondary battery, an irreversible capacity is generated. Accordingly, lithium ions extracted from a cathode active material at the time of initial charge are consumed for generating the irreversible capacity. In this case, if a charging voltage at the time of initial charge of the secondary battery is high (such as a value equal to or more than 4.4 V), a sufficient amount of lithium ions is extracted from the cathode active material, and therefore, the lithium ions are consumed for generating the irreversible capacity in the anode. Thereby, the generation reaction of the irreversible capacity is completed at the time of initial charge and discharge. Therefore, at the time of subsequent charge and discharge performed at the point of substantial use of the secondary battery after the initial charge and discharge, the lithium ions extracted from the cathode active material are consumed for generating a battery capacity. Thereby, a high battery capacity is stably obtained at the time of subsequent charge and discharge after the initial charge.

It is to be noted that, in the case where an anode active material used for the secondary battery together with the cathode active material is a metal-based material or an oxide thereof, the irreversible capacity may be generated thereby as well. One reason for this is that the lithium ions extracted from the cathode active material at the time of initial charge are likely to be irreversibly reacted with elements in the metal-based material or oxygen in the oxide thereof. Examples of the metal-based material include a material containing Si, Sn, or both since high energy density is thereby obtainable. More specifically, examples of the metal-based material include one or more of a simple substance, an alloy, and a compound of Si and a simple substance, an alloy, and a compound of Sn. Examples of the oxide of the metal-based material include $SiO_v$ ($0.2 < v < 1.4$) as an oxide of Si and an oxide of Sn (with an arbitrary composition). In particular, in the case where the anode active material is the oxide of the metal-based material, the irreversible capacity tends to be increased. It is to be noted that the irreversible capacity tends to be increased similarly in the case where the anode active material is a low crystallinity carbon, an amorphous carbon, or the like.

A composition of the lithium-containing compound is not particularly limited as long as the compound contains one or more elements as constituent elements together with Li. Types of the foregoing "one or more elements" may be a metal element (including a metalloid element), a nonmetal element, or both thereof. Further, the metal element may contain a transition metal element, or does not necessarily contain a transition metal element.

The lithium-containing compound is represented by, for example, the following Formula (1). More specifically, the lithium-containing compound is a lithium-transition-metal composite oxide containing Li and one or more transition metal elements as constituent elements.

$$Li_{1+a}[Mn_b M_{1-b}]_{1-a} O_{2-c} \qquad (1)$$

In Formula (1), M represents one or more transition metal elements (excluding Mn), and a to c satisfy $0 < a < 0.25$, $0.3 \le b < 0.7$, and $-0.1 \le c \le 0.2$.

As transition metal elements, the lithium-containing compound represented by Formula (1) contains one or more transition metal elements (M) other than Mn together with Mn. One reason why the lithium-containing compound contains Mn as a constituent element is that high energy density is obtained thereby. Types of M are not particularly limited as long as M is one or more of transition metal elements other than Mn. In particular, it is preferable that M be one or more of Co, Ni, Fe, and the like. It is more preferable that M be Co, Ni, or both, since energy density is further increased thereby.

The lithium-containing compound is preferably represented by the following Formula (2), since higher energy density is obtained thereby. As is clear from feasible ranges of e and f, the lithium-containing compound typically contains Mn and Ni as constituent elements. However, the lithium-containing does not necessarily contain Co as a constituent element.

$$Li_{1+d}[Mn_e Co_f Ni_{1-e-f}]_{1-d} O_{2-g} \qquad (2)$$

In Formula (2), d to g satisfy $0 < d < 0.25$, $0.3 \le e < 0.7$, $0 \le f < (1-e)$, and $-0.1 \le g \le 0.2$.

In particular, product SD of specific surface area S ($m^2/g$) and crystallite diameter D (μm) (=specific surface area S×crystallite diameter D) of the lithium-containing compound is equal to or more than $1.4 \times 10^{-6}$ $m^3/g$, and is preferably equal to or more than $1.8 \times 10^{-6}$ $m^3/g$. One reason for this is that, in this case, in a lithium-rich lithium compound having a bedded salt-type crystal structure, a relation between the specific surface area S and the crystallite diameter D becomes appropriate, and therefore, resistance is decreased. Thereby, even if high-voltage charge is performed, lithium ions are easily inserted and extracted.

More specifically, in general, as a resistance component generated when lithium ions are inserted and extracted in a lithium-containing compound, three types of resistances that are bulk resistance, grain boundary resistance, and electrode interface resistance are known. The "bulk resistance" is a resistance generated due to a diffusion coefficient of a lithium ion and a diffusion distance of the lithium ion to an interface between the lithium-containing compound and an electrolytic solution. The "grain boundary resistance" is a resistance generated due to diffusion of a lithium ion in an interface between crystallites. The "electrode interface resistance" is a reaction resistance generated due to insertion and extraction of a lithium ion in an interface between the lithium-containing compound and an electrolytic solution.

It is presumed that, of the foregoing three types of resistance components, the grain boundary resistance and the electrode interface resistance are larger than the bulk resistance in the lithium-containing compound having a bedded salt-type crystal structure. Therefore, in a secondary battery using a lithium-containing compound as a cathode active material, the grain boundary resistance and the electrode interface resistance may largely influence the load characteristics.

In the lithium-containing compound, in the case where the specific surface area S is increased, a portion (area) into/from which lithium ions are allowed to be inserted/extracted is increased, and therefore, the electrode interface resistance as a resistance in the interface between the cathode active material and the electrolytic solution is lowered. On the other hand, in the case where the specific surface area S is decreased, the portion (area) into/from which the lithium ions are allowed to be inserted/extracted is decreased, and therefore, the electrode interface resistance is increased.

Further, in the case where the crystallite diameter D is increased, the number of crystallites contained in a unit volume of the lithium-containing compound is decreased, and therefore, the grain boundary resistance as a resistance between crystallites is lowered. On the other hand, in the case where the crystallite diameter D is decreased, the number of crystallites is increased, and therefore, the grain boundary resistance is increased.

In view of the foregoing tendencies, it is necessary to increase both the specific surface area S and the crystallite diameter D in order to decrease the grain boundary resistance and the electrode interface resistance of the lithium-containing compound for the purpose of improving the load characteristics of the secondary battery. However, even if both the specific surface area S and the crystallite diameter D are not increased, balance between both becomes appropriate by increasing one thereof and decreasing the other thereof, and therefore, both the grain boundary resistance and the electrode interface resistance are specifically lowered. A factor (threshold) determining whether or not the balance between the specific surface area S and the crystallite diameter D becomes appropriate is the foregoing value of the product SD ($1.4 \times 10^{-6}$ m$^3$/g). That is, even if both the specific surface area S and the crystallite diameter D are not increased, the balance between both becomes appropriate as long as the specific surface area S and the crystallite diameter D are set so that the product SD becomes equal to or more than $1.4 \times 10^{-6}$ m$^3$/g. Thereby, both the grain boundary resistance and the electrode interface resistance are allowed to be substantially lowered.

For confirmation, the foregoing conditions of the product SD are special conditions only applicable to the lithium-rich lithium-containing compound having a bedded salt-type crystal structure, that is, the lithium-containing compound in which the bulk resistance tends to be sufficiently lower than the grain boundary resistance and the electrode interface resistance.

In other words, in the case where the specific surface area S and the crystallite diameter D are set so that the product SD satisfies the foregoing conditions in the lithium-rich lithium-containing compound having a bedded salt-type crystal structure, a specific advantage that both the grain boundary resistance and the electrode interface resistance are lowered is obtained. On the other hand, even if the specific surface area S and the crystallite diameter D are set so that the product SD satisfies the foregoing conditions in a lithium-containing compound having other crystal structure such as a spinel-type crystal structure, the specific advantage that both the grain boundary resistance and the electrode interface resistance are lowered is not obtained. One reason for this is that, in the lithium-containing compound having a spinel-type crystal structure, a diffusion path of lithium ions is spread in a state of three dimension, and therefore, lithium ions are easily inserted and extracted fundamentally almost without being influenced by the specific surface area S and the crystallite diameter D. Similarly, in a non-lithium-rich lithium-containing compound having a bedded salt-type crystal structure, a lithium-containing compound having an olivine-type crystal structure, or the like, the specific advantage is not obtainable even if the product SD simply satisfies the foregoing conditions.

Examples of the lithium-containing compound having a spinel-type crystal structure include $LiMn_2O_4$. Examples of the non-lithium-rich lithium-containing compound having a bedded salt-type crystal structure include $LiCoO_2$ and $LiNiO_2$. Examples of the lithium-containing compound having an olivine-type crystal structure include $LiFePO_4$ and $LiMnPO_4$.

The "specific surface area S (m$^2$/g)" is measured by a BET method as a specific surface area measurement method as described above. Examples of an apparatus used for the specific surface area measurement method include Fully-automatic BET Specific Surface Area Analyzer Macsorb available from Mountech Co., Ltd. located in Tokyo, Japan. Further, as described above, the "crystallite diameter D (μm)" is calculated from Scherrer's formula based on an analytical result (half bandwidth of a diffraction line in the vicinity of $2θ=19±2°$) by a powder X-ray diffraction method. Examples of an apparatus used for the powder X-ray diffraction method include Powder X-ray Diffraction Analyzer RINT1100 from Rigaku Corporation located in Tokyo, Japan.

It is to be noted that, as long as the product SD satisfies the foregoing conditions, respective values of the specific surface area S and the crystallite diameter D are not particularly limited. In this case, the value of the specific surface area S may be larger than the value of the crystallite diameter D, and vice versa. One reason for this is that, as long as the product SD satisfies the foregoing conditions, the foregoing advantage is obtained without depending on the respective absolute values of the specific surface area S and the crystallite diameter D.

In particular, the specific surface area S is preferably equal to or less than 20 m$^2$/g. One reason for this is that, if the surface area S is excessively large, in a step of forming a cathode using slurry containing a cathode active material, a state of the slurry may be degraded due to a lowered solid content concentration. Thereby, coating with the slurry becomes difficult to be performed, and drying after coating with the slurry takes time. Such lowered solid content concentration is caused by an increased solvent amount necessary for diluting the slurry because of an increased viscosity of the slurry. Further, the crystallite diameter D is preferably equal to or less than 40 µm, and is more preferably equal to or less than 20 µm. One reason for this is that, in the case where the crystallite diameter D is excessively large, a particle diameter becomes enormous even if a single-crystal particle is allowed to be formed, and therefore, in the step of forming the cathode, filling state of the cathode active material and/or the like may be lowered.

The respective values of the specific surface area S and the crystallite diameter D are controlled according to conditions such as steps of synthesizing a lithium-containing compound as a cathode active material and steps of forming a cathode containing the cathode active material. Of the steps of synthesizing the lithium-containing compound, conditions of a step of forming a precursor vary according to a formation method thereof. Examples of conditions in the case of forming the precursor by using a coprecipitation method include types of raw materials, pH at the time of a reaction, reaction temperature, types of additives, reaction speed, and reaction time. Examples of conditions in the case of forming the precursor by using a crushing and mixing method include types of raw materials, crushing intensity, and crushing time. Examples of conditions of a step of firing the precursor include types of raw materials, a mixture ratio, firing temperature, and firing time. Examples of conditions of the steps of forming a cathode include a press pressure at the time of compression molding.

[Method of Using Cathode Active Material]

When a secondary battery using the cathode active material is charged and discharged, the charging voltage (cathode electric potential: standard electric potential with respect to lithium metal) at the time of initial charge is preferably high, and in particular, is preferably equal to or more than 4.4 V. One reason for this is that, in this case, a sufficient amount of lithium ions is extracted from the cathode active material at the time of initial charge, and therefore, a generation reaction of the irreversible capacity is allowed to be substantially completed in the anode. However, in order to suppress a decomposition reaction of the lithium-containing compound, it is preferable that the charging voltage at the time of initial charge be not excessively high, and in particular, be equal to or less than 4.6 V. Charging voltages (cathode electric potential: standard electric potential with respect to lithium metal) at the time of charge after the initial charge are not particularly limited.

[Function and Effect of Cathode Active Material]

According to the cathode active material, the product SD of the specific surface area S and the crystallite diameter D of the lithium-rich lithium-containing compound having a bedded salt-type crystal structure is equal to or more than $1.4\times10^{-6}$ $m^3/g$. In this case, as described above, balance between the specific surface area S and the crystallite diameter D are appropriately set, making it possible to specifically lower both the grain boundary resistance and the electrode interface resistance. Therefore, even if high-voltage charge is performed, lithium ions are easily inserted and extracted. Accordingly, load characteristics of a secondary battery using the cathode active material are allowed to be improved.

In particular, in the case where the lithium-containing compound is the compound represented by Formula (1) or the compound represented by Formula (2), or the product SD is equal to or more than $1.8\times10^{-6}$ $m^3/g$, higher effects are obtainable.

[2. Application Examples of Cathode Active Material (Lithium Secondary Batteries)]

Next, a description will be given of application examples of the foregoing cathode active material. The cathode active material is used for a cathode of a lithium secondary battery, for example.

[2-1. Cathode and Lithium Ion Secondary Battery (Cylindrical Type)]

Figure 2:
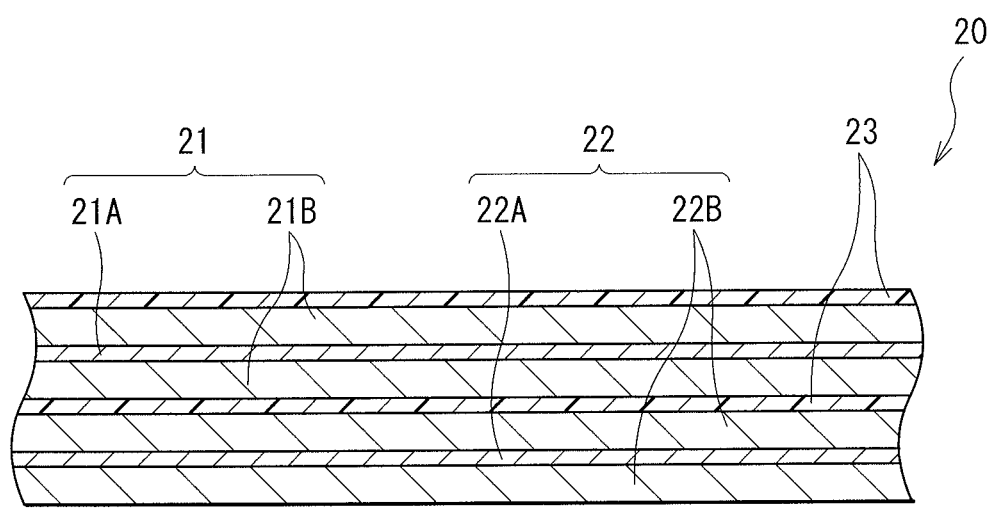
FIG. 2 is a cross-sectional view illustrating an enlarged part of a spirally wound electrode body illustrated in FIG. 1.

FIG. 1 and FIG. 2 illustrate cross-sectional configurations of a cylindrical-type lithium ion secondary battery as an example of a secondary battery. FIG. 2 illustrates enlarged part of a spirally wound electrode body 20 illustrated in FIG. 1.

[Whole Configuration of Secondary Battery]

The secondary battery described here is a lithium ion secondary battery in which the capacity of an anode 22 is obtained by insertion and extraction of Li (lithium ions) as an electrode reactant.

The secondary battery is, for example, a so-called cylindrical-type secondary battery. The secondary battery contains the spirally wound electrode body 20 and a pair of insulating plates 12 and 13 inside a battery can 11 in the shape of a substantially hollow cylinder. In the spirally wound electrode body 20, for example, a cathode 21 and the anode 22 are layered with a separator 23 in between and are spirally wound.

The battery can 11 has a hollow structure in which one end of the battery can 11 is closed and the other end of the battery can 11 is opened. The battery can 11 may be made of, for example, iron, aluminum, an alloy thereof, or the like. It is to be noted that the surface of the battery can 11 may be plated with nickel or the like. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made of, for example, an insulating material. The surface of the gasket 17 may be coated with asphalt.

In the center of the spirally wound electrode body 20, for example, a center pin 24 is inserted. However, the center pin 24 is not necessarily included therein. For example, a cathode lead 25 made of a conductive material such as aluminum is connected to the cathode 21. For example, an anode lead 26 made of a conductive material such as nickel is connected to the anode 22. The cathode lead 25 is attached to the safety valve mechanism 15 by welding or the like, and is electrically connected to the battery cover 14. The anode lead 26 is attached to the battery can 11 by welding or the like, and is electrically connected to the battery can 11.

[Cathode]

The cathode 21 has a cathode active material layer 21B on a single surface or both surfaces of a cathode current collector 21A. The cathode current collector 21A may be made of, for example, a conductive material such as aluminum, nickel, and stainless steel. The cathode active material layer 21B contains the foregoing cathode active material, and may contain other materials such as a cathode binder and a cathode electric conductor as necessary.

Examples of the cathode binder include one or more of synthetic rubbers, polymer materials, and the like. Examples of the synthetic rubber include a styrene-butadiene-based rubber, a fluorine-based rubber, and ethylene propylene diene. Examples of the polymer material include polyvinylidene fluoride and polyimide.

Examples of the cathode electric conductor include one or more of carbon materials and the like. Examples of the carbon materials include graphite, carbon black, acetylene black, and Ketjen black. The cathode electric conductor may be a metal material, a conductive polymer, or the like as long as the material has electric conductivity.

The cathode active material layer 21B may further contain other types of cathode active materials as long as the cathode active material layer 21B contains the foregoing lithium-containing compound as a cathode active material. Examples of such other cathode active materials include lithium-containing compounds (excluding compounds corresponding to the foregoing lithium-containing compound) such as a lithium-transition-metal composite oxide and a lithium-transition-metal-phosphate compound. The lithium-transition-metal composite oxide is an oxide containing Li and one or more transition metal elements as constituent elements. The lithium-transition-metal-phosphate compound is a phosphate compound containing Li and one or more transition metal elements as constituent elements. Examples of the lithium-transition-metal composite oxide include $LiCoO_2$, $LiNiO_2$, and a lithium-nickel-based composite oxide represented by the following Formula (20). Examples of the lithium-transition-metal-phosphate compound include $LiFePO_4$ and $LiFe_{1-u}Mn_uPO_4$ (u<1), since thereby, a high battery capacity is obtained and superior cycle characteristics are obtained.

$$LiNi_{1-z}M_zO_2 \qquad (20)$$

In Formula (20), M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies $0.005<z<0.5$.

In addition thereto, the cathode active material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene. However, the cathode material is not limited to the foregoing materials.

[Anode]

The anode 22 has an anode active material layer 22B on a single surface or both surfaces of an anode current collector 22A.

The anode current collector 22A may be made of, for example, a conductive material such as copper, nickel, and stainless steel. The surface of the anode current collector 22A is preferably roughened. Thereby, due to a so-called anchor effect, adhesion characteristics of the anode active material layer 22B with respect to the anode current collector 22A are improved. In this case, it is enough that the surface of the anode current collector 22A in a region opposed to the anode active material layer 22B is roughened at minimum. Examples of roughening methods include a method of forming fine particles by using electrolytic treatment. The electrolytic treatment is a method of providing concavity and convexity by forming fine particles on the surface of the anode current collector 22A by using an electrolytic method in an electrolytic bath. A copper foil fabricated by an electrolytic method is generally called "electrolytic copper foil."

The anode active material layer 22B contains one or more of anode materials capable of inserting and extracting lithium ions as anode active materials, and may also contain other materials such as an anode binder and an anode electric conductor as necessary. Details of the anode binder and the anode electric conductor are, for example, similar to those of the cathode binder and the cathode electric conductor, respectively. However, the chargeable capacity of the anode material is preferably larger than the discharge capacity of the cathode 21 in order to prevent lithium metal from being unintentionally precipitated on the anode 22 in the middle of charge. That is, the electrochemical equivalent of the anode material capable of inserting and extracting lithium ions is preferably larger than the electrochemical equivalent of the cathode 21.

The anode material is, for example, a carbon material. In the carbon material, its crystal structure change at the time of insertion and extraction of lithium ions is extremely small. Therefore, the carbon material provides high energy density and superior cycle characteristics. Further, the carbon material functions as an anode electric conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. It is to be noted that the shape of the carbon material may be any of a fibrous shape, a spherical shape, a granular shape, and a scale-like shape.

Further, the anode material is, for example, a material (metal-based material) containing one, or two or more of metal elements and metalloid elements, since higher energy density is thereby obtained. Such a metal-based material may be a simple substance, an alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a nonmetallic element. Examples of the structure thereof include a solid solution, a eutectic crystal (eutectic mixture), an intermetallic compound, and a structure in which two or more thereof coexist.

Examples of the foregoing metal elements and the foregoing metalloid elements include one or more of metal elements and metalloid elements capable of forming an alloy with Li. Specific examples thereof include Mg, B, Al, Ga, In, Si, Ge, Sn, Pb, Bi, Cd, Ag, Zn, Hf, Zr, Y, Pd, and Pt. In particular, Si, Sn, or both are preferable. Si and Sn have a superior ability of inserting and extracting lithium ions, and therefore, provide high energy density.

A material containing Si, Sn, or both as constituent elements may be a simple substance, an alloy, or a compound of Si or Sn, may be two or more thereof, or may have one or more phases thereof in part or all thereof. The simple substance merely refers to a simple substance in a general sense (a small amount of impurity may be therein contained), and does not necessarily refer to a purity 100% simple substance.

The alloys of Si contain one or more of elements such as Sn, Ni, Cu, Fe, Co, Mn, Zn, In, Ag, Ti, Ge, Bi, Sb, and Cr as constituent elements other than Si. The compounds of Si contain one or more of C, O, and the like as constituent elements other than Si. For example, the compounds of Si may contain one or more of the elements described for the alloys of Si as constituent elements other than Si.

Examples of the alloys of Si and the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. v in $SiO_v$ may be in the range of $0.2<v<1.4$.

The alloys of Sn contain, for example, one or more of elements such as Si, Ni, Cu, Fe, Co, Mn, Zn, In, Ag, Ti, Ge, Bi, Sb, and Cr as constituent elements other than Sn. The compounds of Sn contain, for example, one or more of elements such as C and O as constituent elements other than Sn. It is to be noted that the compounds of Sn may contain, for example, one or more of elements described for the alloys of Sn as constituent elements other than Sn. Examples of the alloys of Sn and the compounds of Sn include $SnO_w$ ($0<w\leq2$), $SnSiO_3$, $LiSnO$, and $Mg_2Sn$.

Further, as a material containing Sn, for example, a material containing a second constituent element and a third constituent element in addition to Sn as a first constituent element is preferable. Examples of the second constituent element include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element include one or more of B, C, Al, P, and the like. In the case where the second constituent element and the third constituent element are contained, a high battery capacity, superior cycle characteristics, and the like are obtained.

In particular, a material containing Sn, Co, and C as constituent elements (SnCoC-containing material) is preferable. A composition of the SnCoC-containing material is, for example, as follows. That is, the C content is from 9.9 mass % to 29.7 mass % both inclusive, and the ratio of Sn and Co contents (Co/(Sn+Co)) is from 20 mass % to 70 mass % both inclusive, since high energy density is obtained in such a composition range.

It is preferable that the SnCoC-containing material have a phase containing Sn, Co, and C. Such a phase is preferably low-crystalline or amorphous. The phase is a reaction phase capable of reacting with Li. Due to existence of the reaction phase, superior characteristics are obtained. The half bandwidth of the diffraction peak obtained by X-ray diffraction of the phase is preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with Li is allowed to be easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline reaction phase or the amorphous reaction phase is seen in the range of 2θ=from 20 deg to 50 deg both inclusive. Such a reaction phase has, for example, the foregoing respective constituent elements, and the low crystalline or amorphous structure thereof possibly results from existence of C mainly.

In the SnCoC-containing material, part or all of C as a constituent element are preferably bonded to a metal element or a metalloid element as other constituent element, since cohesion or crystallization of Sn and/or the like is suppressed thereby. The bonding state of elements is allowed to be checked by, for example, X-ray photoelectron spectroscopy (XPS). In a commercially available device, for example, Al-Kα ray, Mg-Kα ray, or the like is used as a soft X ray. In the case where part or all of C are bonded to a metal element, a metalloid element, or the like, the peak of a synthetic wave of 1s orbit of C (C1s) is shown in a region lower than 284.5 eV. In the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis is made by using commercially available software to isolate both peaks from each other. In the waveform analysis, the position of the main peak existing on the lowest bound energy side is the energy standard (284.8 eV).

It is to be noted that the SnCoC-containing material is not limited to the material configured of only Sn, Co, and C (SnCoC) as constituent elements. That is, the SnCoC-containing material may further contain, for example, one or more of Si, Fe, Ni, Cr, In, Nb, Ge, Ti, Mo, Al, P, Ga, Bi, and the like as constituent elements as necessary.

In addition to the SnCoC-containing material, a material containing Sn, Co, Fe, and C as constituent elements (SnCoFeC-containing material) is also preferable. A composition of the SnCoFeC-containing material is optional. For example, a composition in which the Fe content is set small is as follows. That is, the C content is from 9.9 mass % to 29.7 mass % both inclusive, the Fe content is from 0.3 mass % to 5.9 mass % both inclusive, and the ratio of contents of Sn and Co (Co/(Sn+Co)) is from 30 mass % to 70 mass % both inclusive. Further, a composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, a metal oxide, a polymer compound, or the like.

Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a vapor-phase deposition method, a liquid-phase deposition method, a spraying method, a firing method (sintering method), or a combination of two or more of these methods. The coating method is a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method include a physical deposition method and a chemical deposition method. More specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method include an electrolytic plating method and an electroless plating method. The spraying method is a method in which an anode active material in a fused state or a semi-fused state is sprayed to the anode current collector 22A. The firing method is, for example, a method in which after the anode current collector 22A is coated by using a coating method, heat treatment is performed at temperature higher than the melting point of the anode binder and/or the like. Examples of the firing method include a known technique such as an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is preferably larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 is, for example, a porous film made of a synthetic resin, ceramics, or the like. The separator 23 may be a laminated film in which two or more types of porous films are laminated. Examples of the synthetic resin include polytetrafluoroethylene, polypropylene, and polyethylene.

In particular, the separator 23 may include, for example, the foregoing porous film (base material layer) and a polymer compound layer provided on one surface or both surfaces of the base material layer. Thereby, adhesion characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer contains, for example, a polymer material such as polyvinylidene fluoride, since such a polymer material has a superior physical strength and is electrochemically stable. However, the polymer material may be a material other than polyvinylidene fluoride. The polymer compound layer may be formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains a solvent and an electrolyte salt, and may contain other material such as an additive.

The solvent contains one or more of nonaqueous solvents such as an organic solvent. Examples of the nonaqueous solvents include a cyclic ester carbonate, a chain ester carbonate, lactone, a chain carboxylic ester, and nitrile, since a superior battery capacity, superior cycle characteristics, superior conservation characteristics, and the like are thereby obtained. Examples of the cyclic ester carbonate include ethylene carbonate, propylene carbonate, and butylene carbonate. Examples of the chain ester carbonate include dimethyl carbonate, diethyl carbonate, ethyl methyl carbonate, and methylpropyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, one or more of ethylene carbonate, propylene carbonate, dimethyl carbonate, diethyl carbonate, and ethyl methyl carbonate are preferable, since a superior battery capacity, superior cycle characteristics, superior conservation characteristics, and the like are thereby obtained. In this case, a combination of a high viscosity (high dielectric constant) solvent (for example, specific dielectric constant $\in \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. One reason for this is that the dissociation property of the electrolyte salt and ion mobility are thereby improved.

In particular, the solvent preferably contains one or more of unsaturated cyclic ester carbonates. One reason for this is that a stable protective film is formed mainly on the surface of the anode 22 at the time of charge and discharge, and therefore, a decomposition reaction of the electrolytic solution is suppressed. The unsaturated cyclic ester carbonate is a cyclic ester carbonate having one or more unsaturated carbon bonds (carbon-carbon bonds). Specific examples of the unsaturated cyclic ester carbonate include vinylene carbonate, vinylethylene carbonate, and methyleneethylene carbonate. The unsaturated cyclic ester carbonate may be a compound other than the foregoing compounds. Although the content of the unsaturated cyclic ester carbonate in the solvent is not particularly limited, the content thereof may be, for example, from 0.01 wt % to 10 wt % both inclusive.

Further, the solvent preferably contains one or more of halogenated ester carbonates. One reason for this is that a stable protective film is formed mainly on the surface of the anode 22 at the time of charge and discharge, and therefore, a decomposition reaction of the electrolytic solution is suppressed. The halogenated ester carbonate is a cyclic ester carbonate having one or more halogens as constituent elements or a chain ester carbonate having one or more halogens as constituent elements. Examples of the cyclic halogenated ester carbonate include 4-fluoro-1,3-dioxolane-2-one and 4,5-difluoro-1,3-dioxolane-2-one. Examples of the chain halogenated ester carbonate include fluoromethyl methyl carbonate, bis(fluoromethyl)carbonate, and difluoromethyl methyl carbonate. However, specific examples of the halogenated ester carbonate include a compound other than the foregoing compounds. Although the content of the halogenated ester carbonate in the solvent is not particularly limited, the content thereof may be, for example, from 0.01 wt % to 50 wt % both inclusive.

Further, the solvent preferably contains sultone (cyclic sulfonic ester), since the chemical stability of the electrolytic solution is more improved thereby. Examples of sultone include propane sultone and propene sultone. Examples thereof include a compound other than the foregoing compounds. Although the sultone content in the solvent is not particularly limited, for example, the sultone content may be from 0.5 wt % to 5 wt % both inclusive.

Further, the solvent preferably contains an acid anhydride since the chemical stability of the electrolytic solution is thereby further improved. Examples of the acid anhydrides include a carboxylic anhydride, a disulfonic anhydride, and a carboxylic acid sulfonic acid anhydride. Examples of the carboxylic anhydride include a succinic anhydride, a glutaric anhydride, and a maleic anhydride. Examples of the disulfonic anhydride include an ethane disulfonic anhydride and a propane disulfonic anhydride. Examples of the carboxylic acid sulfonic acid anhydride include a sulfobenzoic anhydride, a sulfopropionic anhydride, and a sulfobutyric anhydride. However, specific examples of the acid anhydrides include a compound other than the foregoing compounds. Although the content of the acid anhydride in the solvent is not particularly limited, for example, the content thereof may be from 0.5 wt % to 5 wt % both inclusive.

The electrolyte salt contains, for example, one or more of salts such as a lithium salt. However, the electrolyte salt may contain, for example, a salt other than the lithium salt (such as a light metal salt other than the lithium salt).

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Examples thereof include a compound other than the foregoing compounds. Thereby, a superior battery capacity, superior cycle characteristics, superior conservation characteristics, and the like are obtained.

In particular, one or more of $LiPF_6$, $LiBF_4$, $LiClO_4$, and $LiAsF_6$ are preferable, and $LiPF_6$ is more preferable, since the internal resistance is thereby lowered, and therefore, a higher effect is obtained.

Although the content of the electrolyte salt is not particularly limited, in particular, the content thereof may be preferably from 0.3 mol/kg to 3.0 mol/kg both inclusive with respect to the solvent, since high ion conductivity is obtained thereby.

[Operation of Secondary Battery]

In the secondary battery, for example, at the time of charge, lithium ions extracted from the cathode 21 are inserted in the anode 22 through the electrolytic solution. Further, at the time of discharge, lithium ions extracted from the anode 22 are inserted in the cathode 21 through the electrolytic solution.

In this case, as described above, in order to complete the generation reaction of the irreversible capacity in the anode 22 at the time of initial charge, the charging voltage (such as 4.6 V) at the time of initial charge is preferably higher than the charging voltage (such as 4.35 V) at the time of charge after the initial charge.

[Method of Manufacturing Secondary Battery]

The secondary battery is manufactured, for example, by the following procedure.

First, the cathode 21 is fabricated. The foregoing cathode active material is mixed with a cathode binder, a cathode electric conductor, and/or the like as necessary to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. In this case, the cathode active material layer 21B may be formed only on a single surface of the cathode current collector 21A. Subsequently, the cathode active material layer 21B is compression-molded by using a roll pressing machine and/or the like while being heated as necessary. In this case, compression-molding may be repeated several times.

Further, the anode 22 is fabricated by a procedure similar to that of the cathode 21 described above. An anode active material is mixed with an anode binder, an anode electric conductor, and/or the like as necessary to prepare an anode mixture, which is subsequently dispersed in an organic solvent or the like to form paste anode mixture slurry. Subsequently, a single surface or both surfaces of the anode current collector 22A are coated with the anode mixture slurry, which is dried to form the anode active material layer 22B. Thereafter, the anode active material layer 22B is compression-molded as necessary.

Finally, the secondary battery is assembled by using the cathode 21 and the anode 22. The cathode lead 25 is attached to the cathode current collector 21A by using a welding method and/or the like, and the anode lead 26 is attached to the anode current collector 22A by using a welding method and/or the like. Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by using a welding method and/or the like, and the end tip of the anode lead 26 is attached to the battery can 11 by using a welding method and/or the like. Subsequently, the electrolytic solution in which an electrolyte salt and/or the like is dispersed in a solvent is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical-type lithium ion secondary battery, the cathode active material layer 21B of the cathode 21 contains the foregoing cathode active material. Therefore, as a description has been given in detail of the cathode active material, even if a high-voltage charge is performed, lithium ions are easily inserted and extracted. Accordingly, load characteristics are allowed to be improved. In particular, in the case where a metal-based material or an oxide thereof that increases the irreversible capacity is used as an anode active material of the anode 22, higher effects are obtainable. Further, in the case where a low crystallinity carbon, an amorphous carbon, or the like is used as an anode active material, the irreversible capacity is also increased, and therefore, similar effects are obtainable. Other functions and other effects are similar to those of the cathode active material.

[2-2. Cathode and Lithium Ion Secondary Battery (Laminated Film Type)]

Figure 3:
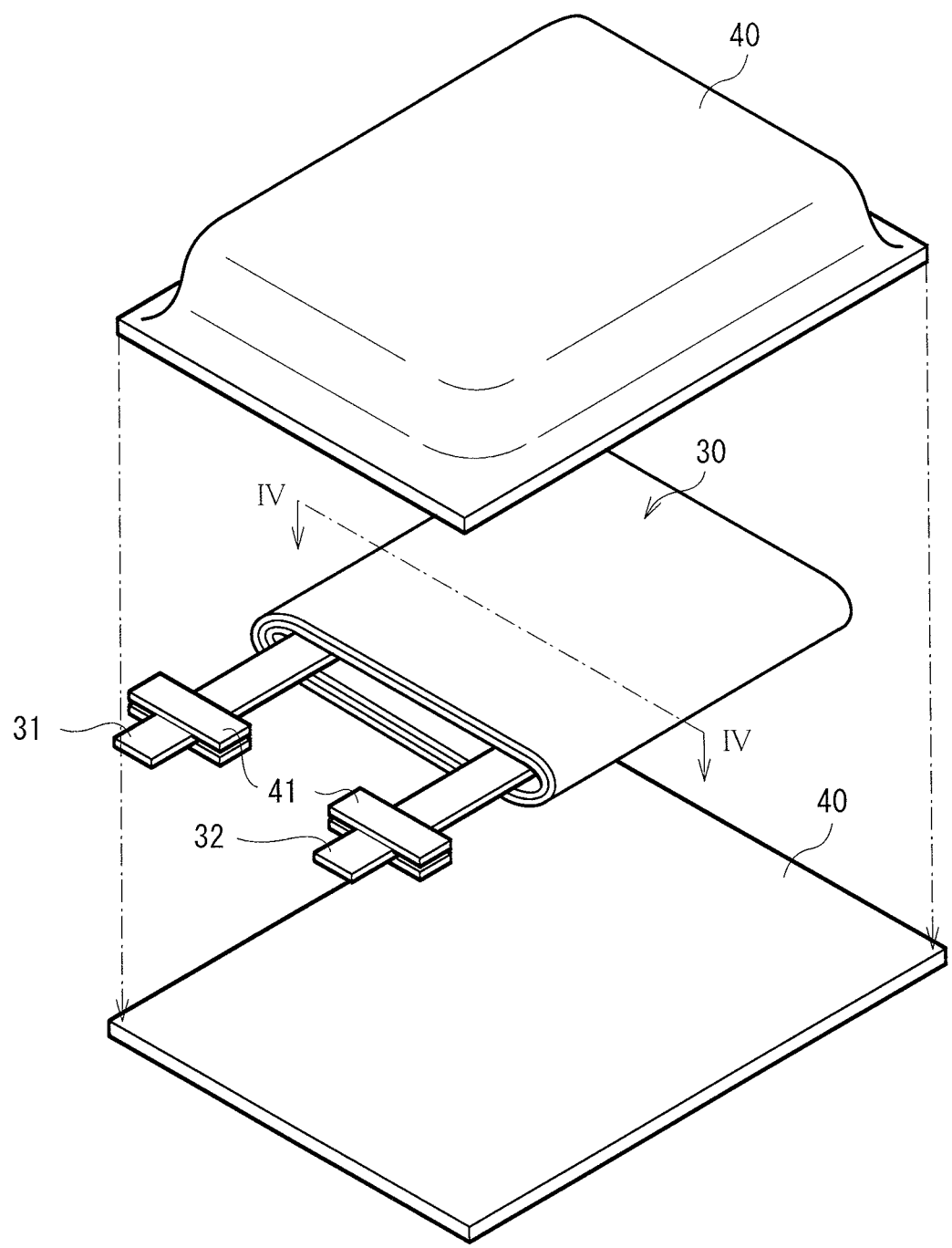
FIG. 3 is a perspective view illustrating a configuration of another secondary battery (laminated film type) according to the embodiment of the present application.
Figure 4:
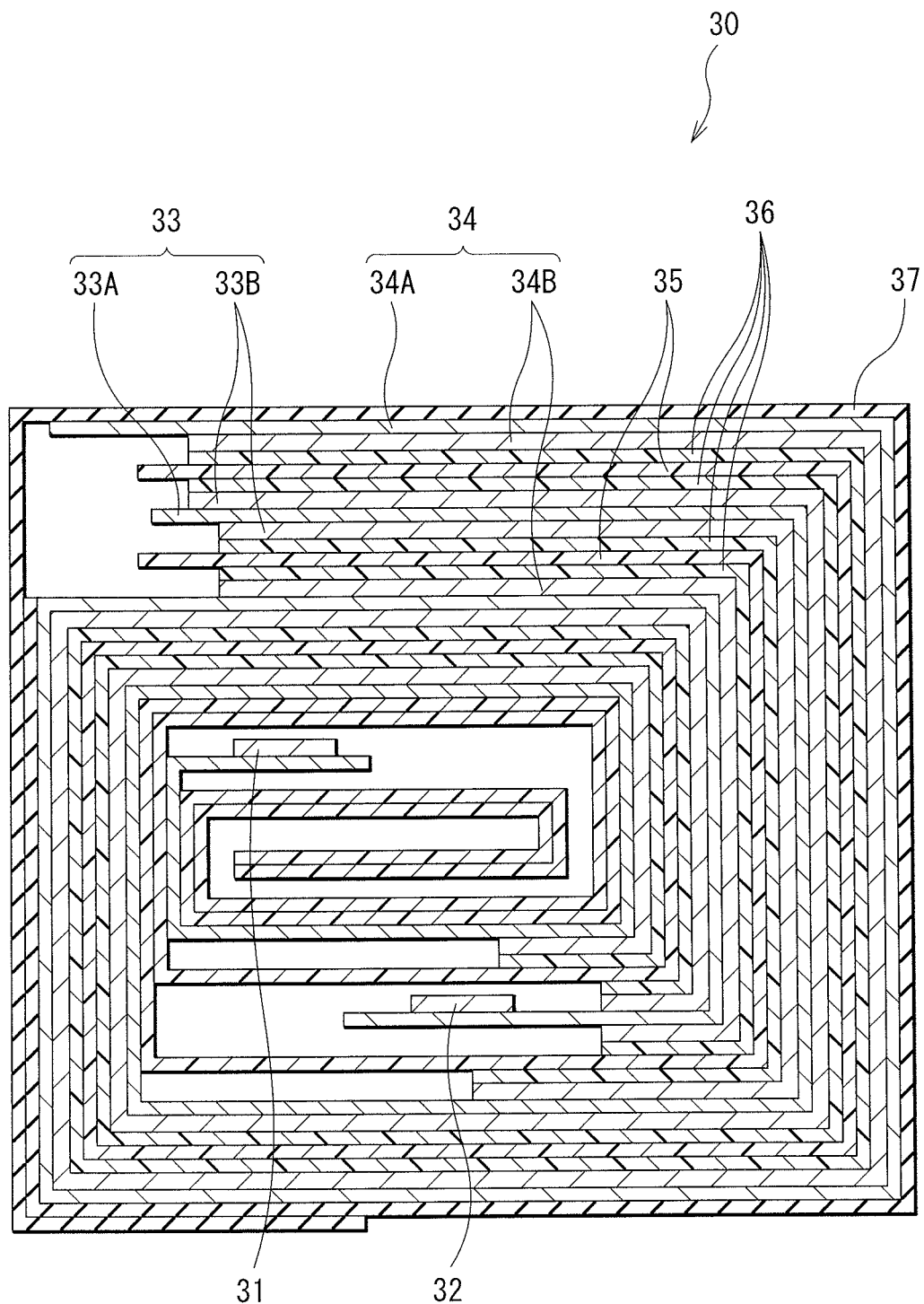
FIG. 4 is a cross-sectional view taken along a line IV-IV of a spirally wound electrode body illustrated in FIG. 3.

FIG. 3 illustrates an exploded perspective configuration of a laminated-film-type secondary battery. FIG. 4 illustrates an enlarged cross-section taken along a line IV-IV of a spirally wound electrode body 30 illustrated in FIG. 3. In the following description, the elements of the cylindrical-type lithium ion secondary battery described above will be used as necessary.

[Whole Configuration of Secondary Battery]

The secondary battery is a so-called laminated-film-type lithium ion secondary battery. In the secondary battery, the spirally wound electrode body 30 is contained in a film-like outer package member 40. In the spirally wound electrode body 30, a cathode 33 and an anode 34 are layered with a separator 35 and an electrolyte layer 36 in between and are spirally wound. In the spirally wound electrode body 30, a cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from inside to outside of the outer package member 40 in the same direction. The cathode lead 31 is made of, for example, a conductive material such as aluminum, and the anode lead 32 is made of, for example, a conducive material such as copper, nickel, and stainless steel. These conductive materials are in the shape of, for example, a thin plate or mesh.

The outer package member 40 is a laminated film in which, for example, a fusion bonding layer, a metal layer, and a surface protective layer are laminated in this order. In the laminated film, for example, the respective outer edges of the fusion bonding layers of two films are bonded to each other by fusion bonding, so that the fusion bonding layers and the spirally wound electrode body 30 are opposed to each other. The two films may be attached to each other by an adhesive, or the like. Examples of the fusion bonding layer include a film made of polyethylene, polypropylene, or the like. Examples of the metal layer include an aluminum foil. Examples of the surface protective layer include a film made of nylon, polyethylene terephthalate, or the like.

In particular, as the outer package member 40, an aluminum laminated film in which a polyethylene film, an aluminum foil, and a nylon film are laminated in this order is preferable. However, the outer package member 40 may be made of a laminated film having other laminated structure, a polymer film such as polypropylene, or a metal film.

An adhesive film 41 to protect from outside air intrusion is inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics include a polyolefin resin such as polyethylene, polypropylene, modified polyethylene, and modified polypropylene.

The cathode 33 has, for example, a cathode active material layer 33B on both surfaces of a cathode current collector 33A. The anode 34 has, for example, an anode active material layer 34B on both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. That is, the cathode active material layer 33B contains the foregoing cathode active material. Further, the configuration of the separator 35 is similar to the configuration of the separator 23.

[Electrolyte Layer]

In the electrolyte layer 36, an electrolytic solution is held by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may contain other material such as an additive as necessary.

The polymer compound contains one or more of polymer materials. Examples of the polymer materials include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, a copolymer may be used. Examples of the copolymer include a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to the composition of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. On the other hand, at the time of discharge, lithium ions extracted from the anode 34 are inserted in the cathode 33 through the electrolyte layer 36. In this case, again, in order to complete a generation reaction of the irreversible capacity in the anode 34 at the time of initial charge, the charging voltage at the time of initial charge is preferably higher than the charging voltage at the time of charge after the initial charge.

[Method of Manufacturing Secondary Battery]

The secondary battery including the gel electrolyte layer 36 is manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on a single surface or both surfaces of the cathode current collector 33A, and the anode 34 is fabricated by forming the anode active material layer 34B on a single surface or both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by using a welding method and/or the like and the anode lead 32 is attached to the anode current collector 34A by using a welding method and/or the like. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by using a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by using a thermal fusion bonding method and/or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as necessary is prepared, which is injected into the pouch-like outer package member 40. Thereafter, the outer package member 40 is hermetically sealed by using a thermal fusion bonding method and/or the like. Subsequently, the monomer is thermally polymerized, and thereby, a polymer compound is formed. Accordingly, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, or a multicomponent copolymer) containing vinylidene fluoride as a component. Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by using a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like hardly remain in the electrolyte layer 36 compared to in the second procedure. Therefore, the formation step of the polymer compound is favorably controlled. Therefore, sufficient adhesion characteristics are obtained between the cathode 33 and the electrolyte layer 36, between the anode 34 and the electrolyte layer 36, and between the separator 35 and the electrolyte layer 36.

[Function and Effect of Secondary Battery]

According to the laminated-film-type lithium ion secondary battery, since the cathode active material layer 33B of the cathode 33 contains the foregoing cathode active material, load characteristics are allowed to be improved as in the cylindrical-type lithium ion secondary battery. Other functions and other effects are similar to those of the cylindrical-type lithium ion secondary battery.

[2-3. Cathode and Lithium Metal Secondary Battery]

A secondary battery hereinafter described is a lithium metal secondary battery in which the capacity of the anode is represented by precipitation and dissolution of lithium metal. The secondary battery has a configuration similar to that of the foregoing cylindrical-type lithium ion secondary battery, except that the anode active material layer 22B is configured of the lithium metal, and is manufactured by a procedure similar to that of the foregoing cylindrical-type lithium ion secondary battery.

In the secondary battery, the lithium metal is used as an anode active material, and thereby, higher energy density is obtainable. The anode active material layer 22B may exist at the time of assembling, or the anode active material layer 22B does not necessarily exist at the time of assembling and may be configured of the lithium metal precipitated at the time of charge. Further, the anode active material layer 22B may be used as a current collector as well, and the anode current collector 22A may be omitted.

In the secondary battery, for example, at the time of charge, lithium ions are discharged from the cathode 21, and are precipitated as the lithium metal on the surface of the anode current collector 22A through the electrolytic solution with which the separator 23 is impregnated. Further, for example, at the time of discharge, the lithium metal is eluded as lithium ions from the anode active material layer 22B, and is inserted in the cathode 21 through the electrolytic solution with which the separator 23 is impregnated.

According to the lithium metal secondary battery, since the cathode active material layer 21B of the cathode 21 contains the foregoing cathode active material, load characteristics are allowed to be improved as in the lithium ion secondary battery. Other functions and other effects are similar to those of the lithium ion secondary battery. It is to be noted that the secondary battery described here is not limited to the cylindrical-type secondary battery, and may be applied to a laminated-film-type secondary battery.

[3. Applications of Secondary Battery]

Next, a description will be given of application examples of the foregoing secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a driving electric power source, an electric power storage source for electric power storage, or the like. In the case where the secondary battery is used as an electric power source, the secondary battery may be used as a main electric power source (electric power source used preferentially), or an auxiliary electric power source (electric power source used instead of a main electric power source or used being switched from the main electric power source). In the latter case, the main electric power source type is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof include a mobile lifestyle electric appliance such as an electric shaver; a memory device such as a backup electric power source and a memory card; an electric power tool such as an electric drill and an electric saw; a battery pack used as an electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. In these applications, since superior battery characteristics are demanded, performance is effectively improved by using the secondary battery according to embodiments of the present application. It is to be noted that the battery pack is an electric power source using a secondary battery, and is a so-called assembled battery or the like. The electric vehicle is a vehicle that works (runs) by using a secondary battery as a driving electric power source, and may also include an automobile (such as a hybrid automobile) that has, in addition to the secondary battery, a drive source other than the secondary battery as described above. The electric power storage system is a system using a secondary battery as an electric power storage source. For example, in a home electric power storage system, electric power is stored in the secondary battery as an electric power storage source, and the electric power is consumed as necessary. Thereby, home electric products and the like become usable. The electric power tool is a tool in which a movable section (such as a drill) is moved by using a secondary battery as a driving electric power source. The electronic apparatus is an apparatus executing various functions by using a secondary battery as a driving electric power source (electric power supply source).

A description will be specifically given of some application examples of the secondary battery. The configurations of the respective application examples described below are merely examples, and may be changed as appropriate.

[3-1. Battery Pack]

Figure 5:
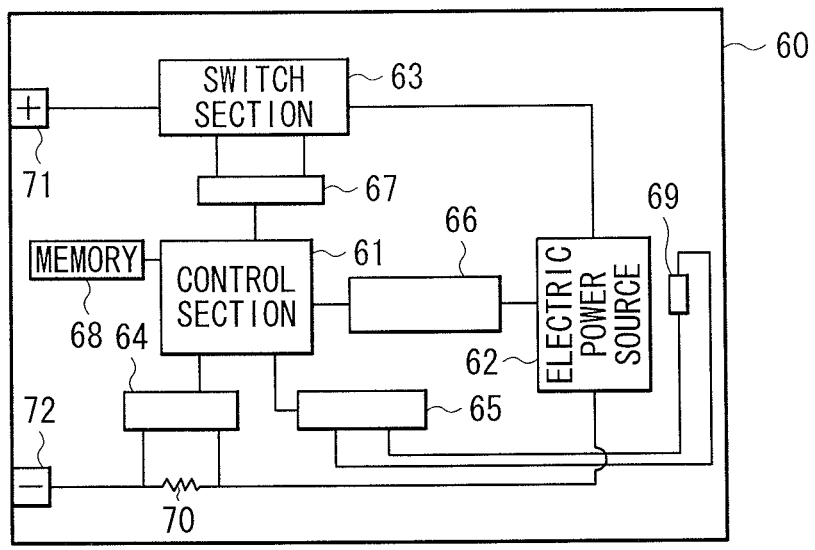
FIG. 5 is a block diagram illustrating a configuration of an application example (battery pack) of the secondary battery.

FIG. 5 illustrates a block configuration of a battery pack. For example, as illustrated in FIG. 5, the battery pack includes a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operation of the whole battery pack (including a used state of the electric power source 62), and includes, for example, a central processing unit (CPU) and/or the like. The electric power source 62 includes one or more secondary batteries (not illustrated). The electric power source 62 is, for example, an assembled battery including two or more secondary batteries. Connection type thereof may be a series-connected type, may be a parallel-connected type, or a mixed type thereof. As an example, the electric power source 62 includes six secondary batteries connected in a manner of dual-parallel and three-series.

The switch section 63 switches the used state of the electric power source 62 (whether or not the electric power source 62 is connectable to an external device) according to an instruction of the control section 61. The switch section 63 includes, for example, a charge control switch, a discharge control switch, a charging diode, a discharging diode, and the like (not illustrated). The charge control switch and the discharge control switch are each, for example, a semiconductor switch such as a field-effect transistor (MOSFET) using a metal oxide semiconductor.

The current measurement section 64 measures a current by using the current detection resistance 70, and outputs the measurement result to the control section 61. The temperature detection section 65 measures temperature by using the temperature detection device 69, and outputs the measurement result to the control section 61. The temperature measurement result is used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage measurement section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage is 4.2 V±0.05 V, and the over-discharge detection voltage is 2.4 V±0.1 V.

The memory 68 is, for example, an EEPROM as a non-volatile memory or the like. The memory 68 stores, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 is, for example, a thermistor or the like.

The cathode terminal 71 and the anode terminal 72 are terminals connected to an external device (such as a notebook personal computer) driven by using the battery pack or an external device (such as a battery charger) used for charging the battery pack. The electric power source 62 is charged and discharged through the cathode terminal 71 and the anode terminal 72.

[3-2. Electric Vehicle]

Figure 6:
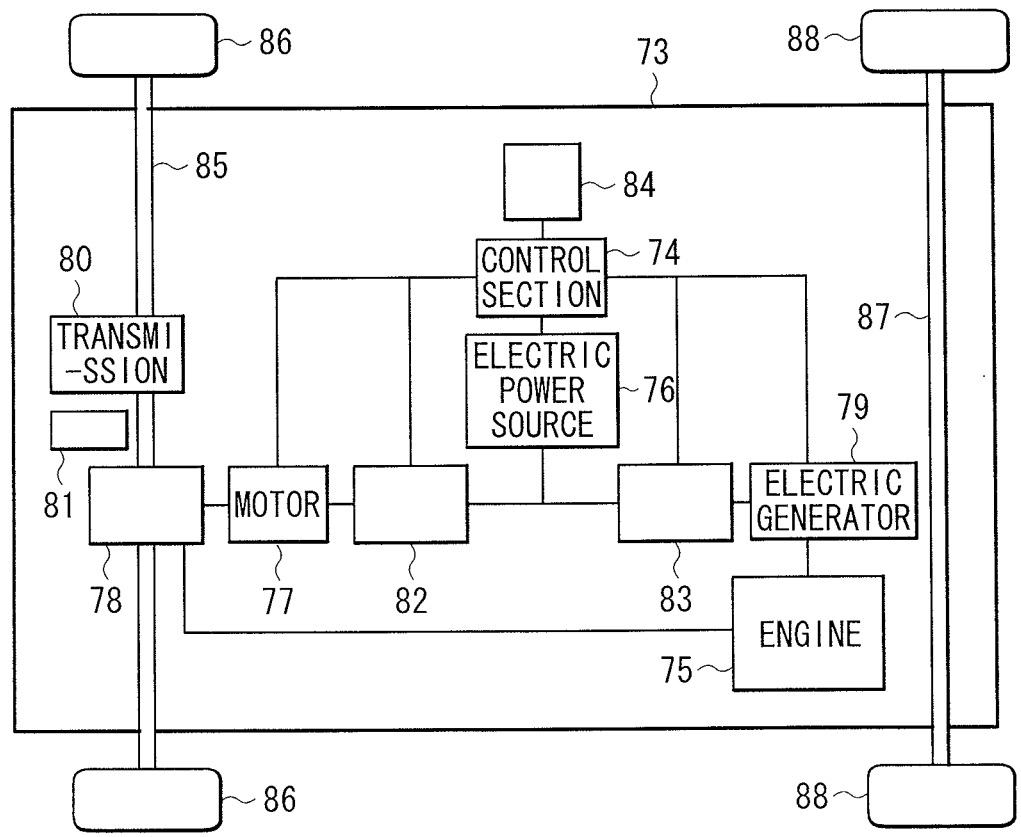
FIG. 6 is a block diagram illustrating a configuration of an application example (electric vehicle) of the secondary battery.

FIG. 6 illustrates a block configuration of a hybrid automobile as an example of electric vehicles. For example, as illustrated in FIG. 6, the electric vehicle includes a control section 74, an engine 75, an electric power source 76, a driving motor 77, a differential 78, an electric generator 79, a transmission 80, a clutch 81, inverters 82 and 83, and various sensors 84 in a body 73 made of metal. In addition thereto, the electric vehicle includes, for example, a front drive shaft 85 and a front wheel 86 that are connected to the differential 78 and the transmission 80, a rear drive shaft 87, and a rear wheel 88.

The electric vehicle is runnable by using one of the engine 75 and the motor 77 as a drive source. The engine 75 is a main power source, and is, for example, a petrol engine. In the case where the engine 75 is used as a power source, drive power (torque) of the engine 75 is transferred to the front wheel 86 or the rear wheel 88 through the differential 78, the transmission 80, and the clutch 81 as drive sections, for example. The torque of the engine 75 is also transferred to the electric generator 79. Due to the torque, the electric generator 79 generates alternating-current electric power. The alternating-current electric power is converted into direct-current electric power through the inverter 83, and the converted power is stored in the electric power source 76. On the other hand, in the case where the motor 77 as a conversion section is used as a power source, electric power (direct-current electric power) supplied from the electric power source 76 is converted into alternating-current electric power through the inverter 82, and the motor 77 is driven by the alternating-current electric power. Drive power (torque) obtained by converting the electric power by the motor 77 is transferred to the front wheel 86 or the rear wheel 88 through the differential 78, the transmission 80, and the clutch 81 as the drive sections, for example.

It is to be noted that the mechanism may be adopted in which, in the case where speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the whole electric vehicle, and, for example, includes a CPU and/or the like. The electric power source 76 includes one or more secondary batteries (not illustrated). The electric power source 76 may be connected to an external electric power source, and electric power may be stored by receiving the electric power from the external electric power source. The various sensors 84 are used, for example, for controlling the number of revolutions of the engine 75 or for controlling opening level (throttle opening level) of an unillustrated throttle valve. The various sensors 84 include, for example, a speed sensor, an acceleration sensor, an engine speed sensor, and/or the like.

The description has been hereinbefore given of the hybrid automobile as an electric vehicle. However, examples of the electric vehicles may include a vehicle (electric automobile) working by using only the electric power source 76 and the motor 77 without using the engine 75.

[3-3. Electric Power Storage System]

Figure 7:
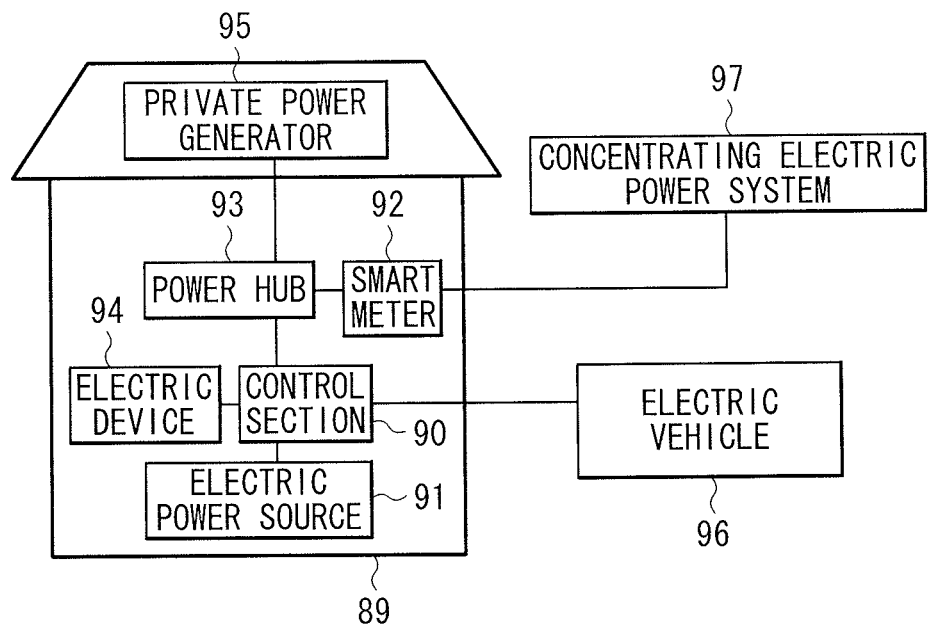
FIG. 7 is a block diagram illustrating a configuration of an application example (electric power storage system) of the secondary battery.

FIG. 7 illustrates a block configuration of an electric power storage system. For example, as illustrated in FIG. 7, the electric power storage system includes a control section 90, an electric power source 91, a smart meter 92, and a power hub 93 inside a house 89 such as a general residence and a commercial building.

In this case, the electric power source 91 is connected to, for example, an electric device 94 arranged inside the house 89, and is connectable to an electric vehicle 96 parked outside the house 89. Further, for example, the electric power source 91 is connected to a private power generator 95 arranged at the house 89 through the power hub 93, and is connectable to an external concentrating electric power system 97 thorough the smart meter 92 and the power hub 93.

It is to be noted that the electric device 94 includes, for example, one or more home electric appliances such as a refrigerator, an air conditioner, a television, and a water heater. The private power generator 95 is, for example, one or more of a solar power generator, a wind-power generator, and the like. The electric vehicle 96 is, for example, one or more of an electric automobile, an electric motorcycle, a hybrid automobile, and the like. The concentrating electric power system 97 is, for example, one or more of a thermal power plant, a nuclear power plant, a hydraulic power plant, a wind-power plant, and the like.

The control section 90 controls operations of the whole electric power storage system (including a used state of the electric power source 91), and, for example, includes a CPU and/or the like. The electric power source 91 includes one or more secondary batteries (not illustrated). The smart meter 92 is, for example, an electric power meter compatible with a network arranged in the house 89 demanding electric power, and is communicable with an electric power supplier. Accordingly, for example, while the smart meter 92 communicates with outside as necessary, the smart meter 92 controls the balance between supply and demand in the house 89 and allows effective and stable energy supply.

In the electric power storage system, for example, electric power is stored in the electric power source 91 from the concentrating electric power system 97 as an external electric power source through the smart meter 92 and the power hub 93, and electric power is stored in the electric power source 91 from the private power generator 95 as an independent electric power source through the power hub 93. As necessary, the electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 by using the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (family units).

[3-4. Electric Power Tool]

Figure 8:
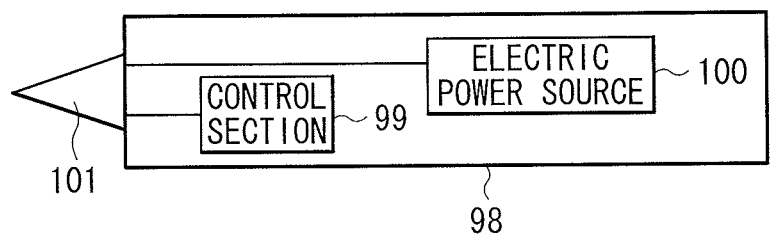
FIG. 8 is a block diagram illustrating a configuration of an application example (electric power tool) of the secondary battery.

FIG. 8 illustrates a block configuration of an electric power tool. For example, as illustrated in FIG. 8, the electric power tool is an electric drill, and includes a control section 99 and an electric power source 100 in a tool body 98 made of a plastic material and/or the like. For example, a drill section 101 as a movable section is attached to the tool body 98 in an operable (rotatable) manner.

The control section 99 controls operations of the whole electric power tool (including a used state of the electric power source 100), and includes, for example, a CPU and/or the like. The electric power source 100 includes one or more secondary batteries (not illustrated). The control section 99 executes control so that electric power is supplied from the electric power source 100 to the drill section 101 as necessary according to operation of an unillustrated operation switch to operate the drill section 101.

EXAMPLES

Specific Examples according to one embodiment of the present application will be described in detail.

Examples 1 to 15

[Synthesis of Cathode Active Material]

Lithium-containing compounds as cathode active materials were obtained by the following procedure. First, manganese sulfate ($MnSO_4$), cobalt sulfate ($CoSO_4$), and nickel sulfate ($NiSO_4$) were mixed. After that, the mixture was treated by using a coprecipitation method to obtain a mixed hydroxide. Subsequently, the mixed hydroxide and lithium hydroxide (LiOH) were mixed, and thereafter, the mixture was fired under the air. Thereby, as illustrated in Table 1, lithium-rich lithium-containing compounds having bedded salt-type crystal structures were obtained. In obtaining the lithium-containing compounds, compounding ratios of the raw materials were adjusted so that desired compositions (mole ratios) were obtained. Also, by changing pH of the coprecipitation method and temperature at the time of firing, the specific surface area S ($m^2/g$), the crystallite diameter D ($\mu m$), and the product SD ($10^{-6}\ m^3/g$) were adjusted.

[Fabrication of Secondary Battery]

To examine load characteristics by using the foregoing cathode active materials, the laminated-film-type lithium ion secondary battery illustrated in FIG. 3 and FIG. 4 was fabricated.

In fabricating the cathode 33, 90 parts by mass of the cathode active material, 5 parts by mass of a cathode binder (polyvinylidene fluoride (PVDF)), and 5 parts by mass of a cathode electric conductor (Ketjen black) were mixed to obtain a cathode mixture. Subsequently, the cathode mixture was dispersed in an organic solvent (N-methyl-2-pyrrolidone (NMP)) to obtain cathode mixture slurry. Subsequently, both surfaces of the cathode current collector 33A (aluminum foil being 15 μm thick) were coated with the cathode mixture slurry uniformly, which was subsequently dried in hot air to form the cathode active material layer 33B. Finally, after the cathode active material layer 33B was compression-molded by using a roll press machine, the cathode current collector 33A on which the cathode active material layer 33B was formed was cut in the shape of a strip (48 mm×300 mm).

In fabricating the anode 34, an anode active material (silicon oxide (SiO) having a median diameter of 7 μm) and 20 wt % polyimide NMP solution were mixed at a mass ratio of 7:2 to obtain anode mixture slurry. Subsequently, both surfaces of the anode current collector 34A (copper foil being 15 μm thick) were coated with the anode mixture slurry uniformly, which was subsequently dried (80 deg C.). After that, the resulting coating film was compression-molded by using a roll press machine. Finally, the coating film was heated (at 700 deg C. for three hours) to form the anode active material layer 34B, and subsequently, the anode current collector 34A on which the anode active material layer 34B was formed was cut in the shape of a strip (50 mm×310 mm).

In assembling the secondary battery, the cathode lead 25 made of aluminum was welded to the cathode current collector 33A of the cathode 33, and the anode lead 26 made of copper was welded to the anode current collector 34A of the anode 34. Subsequently, the cathode 33 and the anode 34 were layered with the separator 35 (microporous polyethylene film being 25 μm thick) in between and were spirally wound in the longitudinal direction to fabricate the spirally wound electrode body 30. After that, the protective tape 37 was adhered to the outermost periphery thereof. Subsequently, after the spirally wound electrode body 30 was sandwiched between two pieces of film-like outer package members 40, the outermost peripheries in three sides of the package members 40 were thermally bonded to obtain a pouched state. The outer package member 40 was a moisture-resistant aluminum laminated film in which a nylon film being 25 μm thick, an aluminum foil being 40 μm thick, and a polypropylene film being 30 μm thick were laminated in order from outside. Finally, an electrolytic solution was injected into the outer package members 40, and the separator 35 was impregnated with the electrolytic solution. After that, the respective remaining one sides of the outer package members 40 were thermally fusion-bonded in reduced-pressure environment. The electrolytic solution was obtained by dissolving an electrolyte salt ($LiPF_6$) in a solvent (ethylene carbonate (EC) and ethylmethyl carbonate (EMC)). The composition (mass ratio) of the solvent was EC:EMC=50:50, and the content of the electrolyte salt with respect to the solvent was 1 $mol/dm^3$ (=1 mol/l).

[Measurement of Battery Characteristics]

Load characteristics of the secondary battery were examined. Results illustrated in Table 1 were obtained.

In examining the load characteristics, two cycles of charge and discharge were performed on the secondary battery. At the first cycle, in the ambient temperature environment (23 deg C.), charge was performed on the secondary battery at a constant current of 100 mA until the battery voltage reached 4.55 V, and subsequently, charge was performed on the secondary battery at a constant voltage of 4.55 V until the current reached 20 mA. Thereafter, discharge was performed on the secondary battery in the same environment at a constant current of 50 mA until the battery voltage reached 2.5 V. At the second cycle, charge and discharge were performed on the secondary battery under conditions similar to those of the first cycle, except that discharge was performed at a constant current of 500 mA. From the charge and discharge results, discharge curves of the first and the second cycles were prepared, and electric potential difference $\Delta V$ (V) of discharge electric potential when the discharge capacity was 25 mAh/g was estimated. In the discharge curves, the horizontal axis represents the discharge capacity (mAh/g) per weight of the cathode active material, and the vertical axis represents the discharge electric potential (V). The electric potential difference $\Delta V$ (V) is calculated by an expression "$\Delta V$ (V) equals (discharge electric potential at the first cycle minus discharge electric potential at the second cycle)".

The present application has been described with reference to the example embodiment and Examples. However, the present application is not limited to the examples described in the above-described embodiment and Examples, and various modifications may be made. For example, the description has been given with the specific examples of the case in which the battery structure is the cylindrical type or the laminated film type, and the battery device has the spirally wound structure. However, applicable structures are not limited thereto. The secondary battery of the present application is similarly applicable to a battery having other battery structure such as a square-type battery, a coin-type battery, and a button-type battery or a battery in which the battery device has other structure such as a laminated structure.

Further, the description has been given of the case using Li as an electrode reactant. However, the electrode reactant is not necessarily limited thereto. As an electrode reactant, for example, other Group 1 element such as Na and K, a Group 2 element such as Mg and Ca, or other light metal such as Al may be used. The effect of the present application may be obtained without depending on the electrode reactant type, and therefore, even if the electrode reactant type is changed, a similar effect is obtainable.

TABLE 1

| Example | Composition | pH | Firing temperature (deg C.) | Specific surface area S ($m^2$/g) | Crystallite diameter D ($\mu$m) | Product SD ($\times 10^{-6}$ $m^3$/g) | Electric potential difference $\Delta V$ (V) |
|---|---|---|---|---|---|---|---|
| 1  | $Li_{1.15}(Mn_{0.66}Co_{0.12}Ni_{0.22})_{0.85}O_2$ | 10 | 850  | 3    | 0.61 | 1.83 | 0.11 |
| 2  | $Li_{1.15}(Mn_{0.66}Co_{0.12}Ni_{0.22})_{0.85}O_2$ | 10 | 800  | 2.5  | 0.69 | 1.73 | 0.12 |
| 3  | $Li_{1.13}(Mn_{0.66}Co_{0.12}Ni_{0.22})_{0.87}O_2$ | 10 | 750  | 3.62 | 0.45 | 1.63 | 0.12 |
| 4  | $Li_{1.15}(Mn_{0.66}Co_{0.12}Ni_{0.22})_{0.85}O_2$ | 10 | 700  | 4.11 | 0.37 | 1.52 | 0.13 |
| 5  | $Li_{1.15}(Mn_{0.66}Co_{0.12}Ni_{0.22})_{0.85}O_2$ | 11 | 950  | 1.97 | 1.02 | 2.01 | 0.11 |
| 6  | $Li_{1.17}(Mn_{0.66}Ni_{0.34})_{0.83}O_2$ | 11 | 960  | 1.13 | 1.24 | 1.4  | 0.13 |
| 7  | $Li_{1.13}(Mn_{0.66}Co_{0.12}Ni_{0.22})_{0.87}O_2$ | 10 | 900  | 1.4  | 0.93 | 1.3  | 0.17 |
| 8  | $Li_{1.2}(Mn_{0.66}Co_{0.12}Ni_{0.22})_{0.8}O_2$ | 10 | 700  | 3.2  | 0.39 | 1.25 | 0.21 |
| 9  | $Li_{1.2}(Mn_{0.66}Co_{0.12}Ni_{0.22})_{0.8}O_2$ | 10 | 850  | 1.25 | 0.95 | 1.19 | 0.18 |
| 10 | $Li_{1.2}(Mn_{0.66}Co_{0.12}Ni_{0.22})_{0.8}O_2$ | 10 | 800  | 1.43 | 0.74 | 1.06 | 0.18 |
| 11 | $Li_{1.13}(Mn_{0.66}Co_{0.12}Ni_{0.22})_{0.87}O_2$ | 10 | 1000 | 0.95 | 1.07 | 1.02 | 0.26 |
| 12 | $Li_{1.15}(Mn_{0.66}Co_{0.12}Ni_{0.22})_{0.85}O_2$ | 10 | 950  | 0.83 | 1.2  | 1    | 0.22 |
| 13 | $Li_{1.13}(Mn_{0.66}Co_{0.12}Ni_{0.22})_{0.87}O_2$ | 10 | 950  | 0.81 | 0.91 | 0.74 | 0.23 |
| 14 | $Li_{1.2}(Mn_{0.66}Co_{0.12}Ni_{0.22})_{0.8}O_2$ | 10 | 950  | 0.39 | 1.53 | 0.6  | 0.38 |
| 15 | $Li_{1.2}(Mn_{0.66}Co_{0.12}Ni_{0.22})_{0.8}O_2$ | 10 | 1000 | 0.29 | 2    | 0.58 | 0.3  |

In the case where the lithium-rich lithium-containing compounds having bedded salt-type crystal structures were used as cathode active materials, the load characteristics showed specific tendencies according to values of the product SD.

More specifically, in the case where the product SD was equal to or more than $1.4 \times 10^{-6}$ $m^3$/g, the electric potential difference $\Delta V$ was kept small compared to the case where the product SD was less than $1.4 \times 10^{-6}$ $m^3$/g without relation to absolute values of the specific surface area S and the crystallite diameter D and magnitude relation thereof. Such a result shows that, in the case where the product SD satisfies the foregoing conditions, lithium ions are easily inserted and extracted even if high-voltage charge is performed, and therefore, the discharge electric potential becomes difficult to be lowered even if charge and discharge are repeated. In this case, in particular, in the case where the product SD was equal to or more than $1.8 \times 10^{-6}$ $m^3$/g, the electric potential difference $\Delta V$ became smaller.

The result of Table 1 showed that, in the case where the lithium-rich lithium-containing compound having a bedded salt-type crystal structure was used as a cathode active material, and the product SD of the specific surface area S and the crystallite diameter D was equal to or more than $1.4 \times 10^{-6}$ $m^3$/g, the load characteristics were improved.

Further, with regard to the product SD, the description has been given of the appropriate range derived from the results of Examples. However, the description does not totally deny a possibility that the product SD is out of the foregoing range. That is, the foregoing appropriate range is a range particularly preferable for obtaining the effects of the present application. Therefore, as long as the effects of the present application are obtained, the product SD may be out of the foregoing range in some degrees.

Furthermore, the application encompasses any possible combination of some or all of the various embodiments and the modifications described herein and incorporated herein.

It is possible to achieve at least the following configurations from the above-described example embodiments, the modifications, the application examples, and the Examples of the disclosure.

[1] A secondary battery, including:
a cathode;
an anode; and
an electrolytic solution,
the cathode including a lithium-rich lithium-containing compound having a bedded salt-type crystal structure, and
a product SD of a specific surface area S in square meters per gram and a crystallite diameter D in micrometer of the lithium-containing compound being equal to or more than about $1.4\times10^{-6}$ cubic meters per gram.

[2] The secondary battery according to [1], wherein the lithium-containing compound is represented by the following Formula (1), $$Li_{1+a}[Mn_bM_{1-b}]_{1-a}O_{2-c} \qquad (1)$$

where M represents one or more transition metal elements excluding element Mn, and a to c satisfy $0<a<0.25$, $0.3\le b<0.7$, and $-0.1\le c\le0.2$.

[3] The secondary battery according to [2], wherein the M in the Formula (1) is one or more selected from a group consisting of elements Co, Ni, and Fe.

[4] The secondary battery according to any one of [1] to [3], wherein the lithium-containing compound is represented by the following Formula (2), $$Li_{1+d}[Mn_eCo_fNi_{1-e-f}]_{1-d}O_{2-g} \qquad (2)$$

where d to g satisfy $0<d<0.25$, $0.3\le e<0.7$, $0\le f<(1-e)$, and $-0.1\le g\le0.2$.

[5] The secondary battery according to any one of [1] to [4], wherein the product SD is equal to or more than about $1.8\times10^{-6}$ cubic meters per gram.

[6] The secondary battery according to any one of [1] to [5], wherein the secondary battery is a lithium secondary battery.

[7] A cathode active material, the cathode active material being
a lithium-rich lithium-containing compound having a bedded salt-type crystal structure, wherein
a product SD of a specific surface area S in square meters per gram and a crystallite diameter D in micrometer is equal to or more than about $1.4\times10^{-6}$ cubic meters per gram.

[8] A cathode, including
a lithium-rich lithium-containing compound having a bedded salt-type crystal structure,
a product SD of a specific surface area S in square meters per gram and a crystallite diameter D in micrometer of the lithium-containing compound being equal to or more than about $1.4\times10^{-6}$ cubic meters per gram.

[9] A battery pack, including:
a secondary battery according to any one of [1] to [6];
a control section controlling a used state of the secondary battery; and
a switch section switching the used state of the secondary battery according to an instruction of the control section.

[10] An electric vehicle, including:
a secondary battery according to any one of [1] to [6];
a conversion section converting electric power supplied from the secondary battery into drive power;
a drive section operating according to the drive power; and
a control section controlling a used state of the secondary battery.

[11] An electric power storage system, including:
a secondary battery according to any one of [1] to [6];
one or more electric devices supplied with electric power from the secondary battery; and
a control section controlling the supplying of the electric power from the secondary battery to the one or more electric devices.

[12] An electric power tool, including:
a secondary battery according to any one of [1] to [6]; and
a movable section being supplied with electric power from the secondary battery.

[13] An electronic apparatus with a secondary battery according to any one of [1] to [6] as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising:
a cathode;
an anode; and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4\times10^{-6}$ cubic meters per gram, wherein the lithium-containing compound is represented by the following Formula (1), $$Li_{1+a}[Mn_bM_{1-b}]_{1-a}O_{2-c} \qquad (1)$$

where M represents one or more transition metal elements excluding element Mn, and a to c satisfy $0<a<0.25$, $0.3\le b<0.7$, and $-0.1\le c\le0.2$.

2. The secondary battery according to claim 1, wherein the M in the Formula (1) is one or more selected from a group consisting of elements Co, Ni, and Fe.

3. The secondary battery according to claim 2, wherein the lithium-containing compound is represented by the following Formula (2), $$Li_{1+d}[Mn_eCo_fNi_{1-e-f}]_{1-d}O_{2-g} \qquad (2)$$

where d to g satisfy $0<d<0.25$, $0.3\le e<0.7$, $0\le f<(1-e)$, and $-0.1\le g\le0.2$.

4. The secondary battery according to claim 1, wherein the product SD is equal to or more than about $1.8\times10^{-6}$ cubic meters per gram.

5. The secondary battery according to claim 1, wherein the secondary battery is a lithium secondary battery.

6. A cathode active material, the cathode active material being a lithium-rich lithium-containing compound having a bedded salt crystal structure, wherein
a product SD of a specific surface area S in square meters per gram and a crystallite diameter D in micrometer is equal to or more than about $1.4\times10^{-6}$ cubic meters per gram, wherein the lithium-containing compound is represented by the following Formula (1), $$Li_{1+a}[Mn_bM_{1-b}]_{1-a}O_{2-c} \qquad (1)$$

where M represents one or more transition metal elements excluding element Mn, and a to c satisfy $0<a<0.25$, $0.3\le b<0.7$, and $-0.1\le c\le0.2$.

7. A cathode, comprising
a lithium-rich lithium-containing compound having a bedded salt crystal structure,
a product SD of a specific surface area S in square meters per gram and a crystallite diameter D in micrometer of the lithium-containing compound being equal to or more than about $1.4\times10^{-6}$ cubic meters per gram, wherein the lithium-containing compound is represented by the following Formula (1), $$Li_{1+a}[Mn_bM_{1-b}]_{1-a}O_{2-c} \qquad (1)$$

where M represents one or more transition metal elements excluding element Mn, and a to c satisfy $0<a<0.25$, $0.3 \leq b<0.7$, and $-0.1 \leq c \leq 0.2$.

8. A battery pack, comprising:
a secondary battery;
a control section controlling a used state of the secondary battery; and
a switch section switching the used state of the secondary battery according to an instruction of the control section, the secondary battery including
a cathode,
an anode, and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4 \times 10^{-6}$ cubic meters per gram, wherein the lithium-containing compound is represented by the following Formula (1), $$Li_{1+a}[Mn_bM_{1-b}]_{1-a}O_{2-c} \tag{1}$$

where M represents one or more transition metal elements excluding element Mn, and a to c satisfy $0<a<0.25$, $0.3 \leq b<0.7$, and $-0.1 \leq c \leq 0.2$.

9. An electric vehicle, comprising:
a secondary battery;
a conversion section converting electric power supplied from the secondary battery into drive power;
a drive section operating according to the drive power; and
a control section controlling a used state of the secondary battery,
the secondary battery including
a cathode,
an anode, and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4 \times 10^{-6}$ cubic meters per gram, wherein the lithium-containing compound is represented by the following Formula (1), $$Li_{1+a}[Mn_bM_{1-b}]_{1-a}O_{2-c} \tag{1}$$

where M represents one or more transition metal elements excluding element Mn, and a to c satisfy $0<a<0.25$, $0.3 \leq b<0.7$, and $-0.1 \leq c \leq 0.2$.

10. An electric power storage system, comprising:
a secondary battery;
one or more electric devices supplied with electric power from the secondary battery; and
a control section controlling the supplying of the electric power from the secondary battery to the one or more electric devices,
the secondary battery including
a cathode,
an anode, and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4 \times 10^{-6}$ cubic meters per gram, wherein the lithium-containing compound is represented by the following Formula (1), $$Li_{1+a}[Mn_bM_{1-b}]_{1-a}O_{2-c} \tag{1}$$

where M represents one or more transition metal elements excluding element Mn, and a to c satisfy $0<a<0.25$, $0.3 \leq b<0.7$, and $-0.1 \leq c \leq 0.2$.

11. An electric power tool, comprising:
a secondary battery; and
a movable section being supplied with electric power from the secondary battery,
the secondary battery including
a cathode,
an anode, and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4 \times 10^{-6}$ cubic meters per gram, wherein the lithium-containing compound is represented by the following Formula (1), $$Li_{1+a}[Mn_bM_{1-b}]_{1-a}O_{2-c} \tag{1}$$

where M represents one or more transition metal elements excluding element Mn, and a to c satisfy $0<a<0.25$, $0.3 \leq b<0.7$, and $-0.1 \leq c \leq 0.2$.

12. An electronic apparatus with a secondary battery as an electric power supply source, the secondary battery comprising:
a cathode;
an anode; and
an electrolytic solution,
the cathode including a lithium-rich lithium-containing compound having a bedded salt crystal structure, and
a product SD of a specific surface area S in square meters per gram and a crystallite diameter D in micrometer of the lithium-containing compound being equal to or more than about $1.4 \times 10^{-6}$ cubic meters per gram, wherein the lithium-containing compound is represented by the following Formula (1), $$Li_{1+a}[Mn_bM_{1-b}]_{1-a}O_{2-c} \tag{1}$$

where M represents one or more transition metal elements excluding element Mn, and a to c satisfy $0<a<0.25$, $0.3 \leq b<0.7$, and $-0.1 \leq c \leq 0.2$.

13. The cathode active material according to claim 6, wherein the M in the Formula (1) is one or more selected from a group consisting of elements Co, Ni, and Fe.

14. The cathode active material according to claim 13, wherein the lithium-containing compound is represented by the following Formula (2), $$Li_{1+d}[Mn_eCo_fNi_{1-e-f}]_{1-d}O_{2-g} \tag{2}$$

where d to g satisfy $0<d<0.25$, $0.3 \leq e<0.7$, $0 \leq f<(1-e)$, and $-0.1 \leq g \leq 0.2$.

15. The cathode according to claim 7, wherein the M in the Formula (1) is one or more selected from a group consisting of elements Co, Ni, and Fe.

16. The cathode according to claim 15, wherein the lithium-containing compound is represented by the following Formula (2), $$Li_{1+d}[Mn_eCo_fNi_{1-e-f}]_{1-d}O_{2-g} \tag{2}$$

where d to g satisfy $0<d<0.25$, $0.3 \leq e<0.7$, $0 \leq f<(1-e)$, and $-0.1 \leq g \leq 0.2$.

17. The secondary battery according to claim 8, wherein the M in the Formula (1) is one or more selected from a group consisting of elements Co, Ni, and Fe.

18. The secondary battery according to claim 17, wherein the lithium-containing compound is represented by the following Formula (2), $$Li_{1+d}[Mn_eCo_fNi_{1-e-f}]_{1-d}O_{2-g} \quad (2)$$

where d to g satisfy $0<d<0.25$, $0.3\leq e<0.7$, $0\leq f<(1-e)$, and $-0.1\leq g\leq 0.2$.

19. The secondary battery according to claim 9, wherein the M in the Formula (1) is one or more selected from a group consisting of elements Co, Ni, and Fe.

20. The secondary battery according to claim 19, wherein the lithium-containing compound is represented by the following Formula (2), $$Li_{1+d}[Mn_eCo_fNi_{1-e-f}]_{1-d}O_{2-g} \quad (2)$$

where d to g satisfy $0<d<0.25$, $0.3\leq e<0.7$, $0\leq f<(1-e)$, and $-0.1\leq g\leq 0.2$.

21. The secondary battery according to claim 10, wherein the M in the Formula (1) is one or more selected from a group consisting of elements Co, Ni, and Fe.

22. The secondary battery according to claim 21, wherein the lithium-containing compound is represented by the following Formula (2), $$Li_{1+d}[Mn_eCo_fNi_{1-e-f}]_{1-d}O_{2-g} \quad (2)$$

where d to g satisfy $0<d<0.25$, $0.3\leq e<0.7$, $0\leq f<(1-e)$, and $-0.1\leq g\leq 0.2$.

23. The secondary battery according to claim 11, wherein the M in the Formula (1) is one or more selected from a group consisting of elements Co, Ni, and Fe.

24. The secondary battery according to claim 23, wherein the lithium-containing compound is represented by the following Formula (2), $$Li_{1+d}[Mn_eCo_fNi_{1-e-f}]_{1-d}O_{2-g} \quad (2)$$

where d to g satisfy $0<d<0.25$, $0.3\leq e<0.7$, $0\leq f<(1-e)$, and $-0.1\leq g\leq 0.2$.

25. The secondary battery according to claim 12, wherein the M in the Formula (1) is one or more selected from a group consisting of elements Co, Ni, and Fe.

26. The secondary battery according to claim 25, wherein the lithium-containing compound is represented by the following Formula (2), $$Li_{1+d}[Mn_eCo_fNi_{1-e-f}]_{1-d}O_{2-g} \quad (2)$$

where d to g satisfy $0<d<0.25$, $0.3\leq e<0.7$, $0\leq f<(1-e)$, and $-0.1\leq g\leq 0.2$.

* * * * *